Sept. 12, 1950 G. SIEVERS 2,522,141
SPEED EQUALIZING LANDING GEAR FOR AIRCRAFT
Filed Oct. 1, 1948
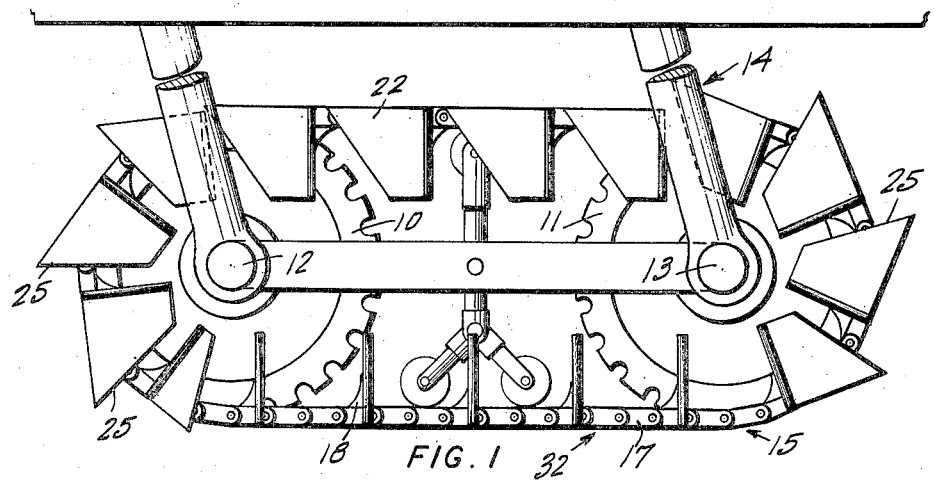
FIG. 1
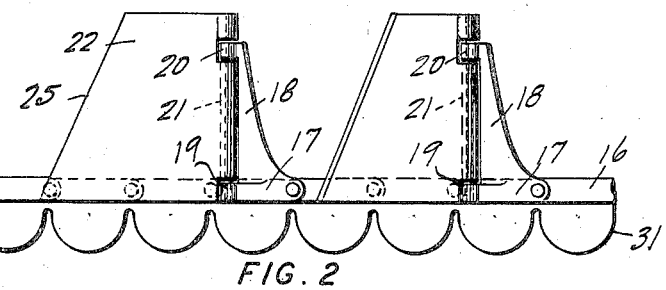
FIG. 2
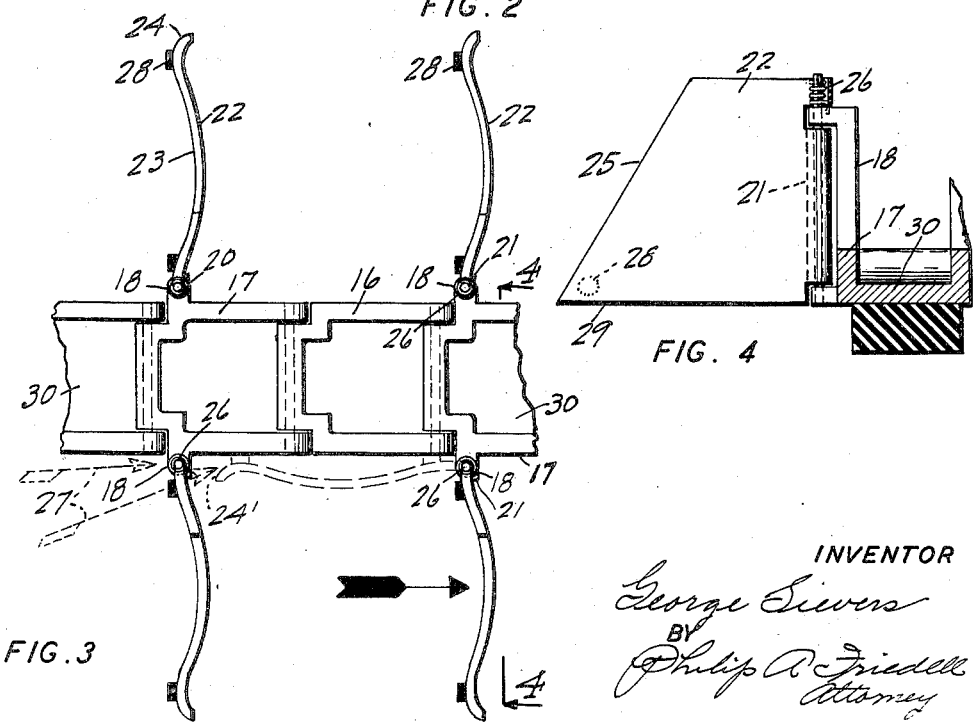
FIG. 3
FIG. 4
INVENTOR
George Sievers
BY
Philip A. Friedell
Attorney Patented Sept. 12, 1950

2,522,141

UNITED STATES PATENT OFFICE 2,522,141

SPEED EQUALIZING LANDING GEAR FOR AIRCRAFT

George Sievers, Oakland, Calif.

Application October 1, 1948, Serial No. 52,345

5 Claims. (Cl. 244—103)

1

This invention relates to improvements in landing gear for aircraft and particularly to endless tread landing gears, and provides a new method of accelerating the speed of the endless tread to that approximating the landing speed of the aircraft, to eliminate or reduce shock on the tread, wheels, wheel suspension, and the aircraft itself when the tread initially contacts the runway.

My new tread accelerator does not appreciably increase the total bulk or displacement of the landing gear, does not interfere with the conventional boot, does not increase the wind resistance other than that required to drive the track, and is driven by the air steam as soon as the landing gear is being projected to landing position.

With the conventional endless track landing gear, or for that matter, with the conventional wheels and tires, the landing wheels are stationary at the time of ground contact being instantly accelerated to the speed of the plane, thus causing a severe shock on the entire landing gear including its mounting, and to the plane itself, and is particularly disastrous so far as the tires are concerned.

With my air-stream accelerated endless track the track is accelerated from the time the landing gear is first lowered and before landing is brought up to approximately the air speed of the plane, thus eliminating or greatly reducing the shock upon contact with the ground.

The objects and advantages of the invention are as follows:

First, to provide an endless track landing gear for airplanes with means to be acted upon by the air stream to accelerate the track to a speed approximating the landing speed of the airplane before landing.

Second, to provide a device as outlined which does not appreciably increase the total bulk of the landing gear.

Third, to provide a device as outlined which does not interfere with the conventional endless track landing gear mountings and which will permit the use of the conventional boot and shock absorbers.

Fourth, to provide a device as outlined with a series of retractable vanes which are opened by the wind stream for driving the lower strand of the tread and closed when passing about the upper strand.

Fifth, to provide spring means for assisting in the retraction of the vanes and for maintaining the vanes in a retracted position during the top travel of the tread.

2

Sixth, to provide means as outlined which is relatively simple in construction and completely automatic in operation through the medium of the air stream during flight of the airplane.

Seventh, to provide vanes as outlined which will not in any way interfere with normal take-off of the airplane.

In describing the invention reference will be had to the accompanying drawings, in which:

Fig. 1 is a side elevation of an endless tread landing gear with my invention applied thereto.

Fig. 2 is an enlarged fragmentary view showing the invention in partly retracted and fully retracted positions and with the tread having rubber shoes mounted thereon.

Fig. 3 is a top plan view of Fig. 2 showing the vanes in projected position and being acted upon by the air stream.

Fig. 4 is a section taken on line 4—4 of Fig. 3.

The invention is applicable to a pair of spaced sprockets 10 and 11 supported on the conventional axles 12 and 13 which are in turn supported by the conventional shock absorbing mounting and retracting unit 14.

The invention consists of an endless track 15 consisting of a multiplicity of links 16, certain ones 17 of which are provided with upstanding brackets 18 each having a pair of ears, 19 and 20 with spanning back stop 21, there being at least two plain links between each two spaced bracketed links.

Mounted hingedly between the ears of each bracket is a vane 22 which, in connection with its bracket substantially spans the space occupied by a bracketed link and the intervening links, and which vane is curved as indicated at 23 to obtain maximum reaction with the air stream, with the outer edge turned back as indicated at 24 to be caused to be opened by the air stream when retracted as indicated at 24' and each of these vanes is formed angularly at the outer end to clear each other as the respective vanes pass about the sprockets as indicated at 25, and each vane is urged to a retracted position by a spring 26 which has just sufficient tension to close the vane against the chain without offering too much resistance against opening by the air stream at 27. Resilient bumpers 28 are provided at the edge 29 coincident with the chain, and the links are each provided with a base 30 for attachment of the live rubber shoes 31. The vanes each have substantially the maximum height possible while clearing the hubs and frame of the sprockets, to provide maximum power from the air stream for driving the tread and sprockets.

The operation of the invention is as follows:

When the landing gear is lowered, the air stream flows against the curved edge 24 as indicated at 27—24' on the lower strand 32 opening the vanes and driving the lower strand in a direction opposite to the direction of flight of the airplane. As this lower strand passes about the rear sprocket 10 the active pressure gradually lessens and at center reaches the zero point at which time the spring 26 urges the vane to retract, but immediately following the air stream reacts with the back of the vane closing it against the chain and maintaining the vane in a retracted position until it passes the front center of the forward sprocket 11 where the air stream acts again on the curved edge 24 as indicated at 24' opening the vane. Thus the track is started moving as soon as the landing gear starts to lower and by the time the track contacts the ground or runway it will have a speed approximating that of the airplane.

The vanes are preferably formed of a lightweight relatively rigid material such as aluminum or aluminum alloy, though a semi-resilient plastic such as a vinyl resin or reinforced rubber would prove preferable because it would flex instead of breaking when contacting an obstruction.

I claim:

1. A speed equalizing landing gear for an aircraft comprising; an endless tread formed of a multiplicity of links pivotally connected in series; a series of equally spaced retractable vanes respectively mounted on spaced ones of said links and projectable laterally by the air stream when passing about the lower section of the landing gear for reaction with the air stream; stop means for limiting projection to a position at right angles to the tread; spring means urging said vanes to close against the tread; said vanes being retractable under the action of the air stream as the tread passes about the upper section of the tread for non-resistance to the air stream, whereby the tread is driven at a speed comparable to that of the speed of the aircraft.

2. A speed equalizing landing gear for aircraft comprising; a pair of spaced sprockets and a frame therefor; an endless tread for said sprockets and comprising a multiplicity of links hingedly connected in series and including spaced links each having a hinge bracket integral therewith; a vane for each bracket and hinged therein at its inner end perpendicular to the adjacent tread portion, said vanes each having a width substantially equal to the length of the intervening links between the bracketed links and having a maximum height to clear the hubs of the sprockets and said frame; stop means on each bracket to limit lateral projection of its vane to a position at right angles to the tread; the outer ends of said vanes being outwardly curved to space the outer end from the tread for reaction with the airstream to project the vane when the vane is in the lower part of its circuit, and to fold the vane against the tread when the vane is in the upper part of its circuit.

3. A speed equalizing landing gear for aircraft comprising; spaced sprockets and a frame therefor; an endless tread comprising a multiplicity of links hingedly connected in series and including spaced ones of said links each having an integral bracket; vanes hinged to said brackets on axes perpendicular to the adjacent tread portion; each of said vanes having a width substantially equal to the combined length of the intervening links between the bracketed links; means on each of said brackets to limit projection of the vanes laterally right angularly to the tread; a resilient bumper on each vane for cooperation with the tread for silencing and to space the outer end of the vane from the tread for reaction with the airstream to project the vane; a relatively light spring limited to just sufficient tension to close the vane against the tread in the absence of dynamic air pressure and cooperating between the vane and the bracket; each of said vanes being concavely formed throughout the major portion of the width and being reverse curved at the outer terminal end for reaction with the air stream for projection when the vane is folded against the tread and is passing the lower portion of its circuit.

4. An endless track for a landing gear for an airplane comprising a multiplicity of links hingedly connected, a bracket formed on each side of each of certain equally spaced links and perpendicular to the face of the adjacent tread portion, with intervening non-bracketed links, a vane having a width spanning the intervening links and a height substantially equal to its width for maximum area and hinged in each bracket and stop means on each bracket to limit the projection of the vane to a position substantially at right angles to the tread; the outer portion of each vane being curved outwardly to engage the air stream when the vane is folded against the tread, whereby the vanes are opened by the air stream when the tread is passing through its lower path and driven to move the tread at a speed approximating the air speed of the airplane and folded by the airstream when the tread is moving through its upper path.

5. A structure as defined in claim 4; said brackets each comprising a vertical support having an ear at each of the upper and lower ends with the vane hinged therebetween, and having a projection extending between said ears at the back thereof to engage the back of the vane and comprising said means to limit the projection.

GEORGE SIEVERS.

REFERENCES CITED

The following references are of record in the file of this patent:

UNITED STATES PATENTS

| Number | Name | Date |
| --- | --- | --- |
| 1,225,181 | Schleicher | May 8, 1917 |
| 2,333,447 | Schippel | Nov. 2, 1943 |
| 2,377,638 | Lueck | June 5, 1945 |
| 2,410,622 | Backstrom | Nov. 5, 1946 |
| 2,463,121 | Sapp | Mar. 1, 1949 |

FOREIGN PATENTS

| Number | Country | Date |
| --- | --- | --- |
| 492,035 | France | Oct. 1, 1918 |
| 523,663 | Great Britain | July 19, 1940 |